(12) United States Patent
Wang (10) Patent No.: US 11,375,532 B2
(45) Date of Patent: Jun. 28, 2022

(54) RESOURCE ALLOCATION METHOD AND APPARATUS, BASE STATION, AND USER EQUIPMENT

(71) Applicant: CHINA ACADEMY OF TELECOMMUNICATIONS TECHNOLOGY, Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/042,842

(22) PCT Filed: Mar. 26, 2019

(86) PCT No.: PCT/CN2019/079666
§ 371 (c)(1),
(2) Date: Sep. 28, 2020

(87) PCT Pub. No.: WO2019/192353
PCT Pub. Date: Oct. 10, 2019

(65) Prior Publication Data
US 2021/0022169 A1    Jan. 21, 2021

(30) Foreign Application Priority Data
Apr. 4, 2018    (CN) .......................... 201810301996.8

(51) Int. Cl.
*H04W 72/12*    (2009.01)
*H04W 72/04*    (2009.01)

(52) U.S. Cl.
CPC ... *H04W 72/1289* (2013.01); *H04W 72/0453* (2013.01); *H04W 72/1231* (2013.01)

(58) Field of Classification Search
CPC . H04W 72/04; H04W 72/042; H04W 72/044; H04W 72/0453; H04W 72/0493;
(Continued)

(56) References Cited

U.S. PATENT DOCUMENTS

2009/0316814 A1* 12/2009 Seo ..................... H04W 72/042
375/260
2011/0110322 A1    5/2011 Koyanagi et al.
(Continued)

FOREIGN PATENT DOCUMENTS

CN    102148791 A    8/2011
CN    103098536 A    5/2013
(Continued)

OTHER PUBLICATIONS

International Search Report from PCT/CN2019/079666, dated Jun. 6, 2019, with English translation provided by WIPO.
(Continued)

*Primary Examiner* — Siu M Lee
(74) *Attorney, Agent, or Firm* — Ladas & Parry, LLP (57) ABSTRACT

A resource allocation method and apparatus, a base station, and UE are provided. The method includes: transmitting DCI including resource allocation indication information to UE, where the resource allocation indication information is used for indicating a resource location of a frequency domain resource allocated to the UE, the frequency domain resource is allocated by using a VRB group as allocation granularity.

16 Claims, 6 Drawing Sheets

(58) Field of Classification Search
CPC ......... H04W 72/1226; H04W 72/1231; H04W 72/1257; H04W 72/1273; H04W 72/1278; H04W 72/1289; H04L 5/001; H04L 5/0007; H04L 5/0044; H04L 5/0053; H04L 5/0094

See application file for complete search history.

(56) References Cited

U.S. PATENT DOCUMENTS

| | | | |
|---|---|---|---|
| 2011/0177822 A1 | 7/2011 | Takanashi | |
| 2012/0087333 A1* | 4/2012 | Huang | H04L 5/0053 370/329 |
| 2013/0034073 A1* | 2/2013 | Aiba | H04L 1/1887 370/329 |
| 2013/0343340 A1 | 12/2013 | Seo et al. | |
| 2014/0016596 A1* | 1/2014 | Kim | H04W 72/042 370/329 |
| 2014/0153524 A1 | 6/2014 | Xu et al. | |
| 2014/0204849 A1* | 7/2014 | Chen | H04L 5/0044 370/329 |
| 2015/0085785 A1 | 3/2015 | Kim et al. | |
| 2019/0052332 A1 | 2/2019 | Shimezawa | |
| 2019/0116594 A1* | 4/2019 | Kwak | H04L 5/0096 |
| 2019/0215807 A1* | 7/2019 | Hwang | H04L 27/2602 |
| 2019/0254091 A1* | 8/2019 | Kim | H04W 76/14 |
| 2019/0349943 A1* | 11/2019 | Wu | H04W 72/0453 |
| 2021/0007107 A1* | 1/2021 | Peng | H04W 72/0446 |

FOREIGN PATENT DOCUMENTS

| | | |
|---|---|---|
| CN | 103298117 A | 9/2013 |
| CN | 103516503 A | 1/2014 |
| CN | 104938014 A | 9/2015 |
| EP | 3723431 A1 | 10/2020 |
| WO | 2009154270 A1 | 12/2009 |
| WO | 2013023363 A1 | 2/2013 |
| WO | 2017169008 A1 | 10/2017 |

OTHER PUBLICATIONS

Written Opinion of the International Searching Authority from PCT/CN2019/079666, dated Jun. 6, 2019, with English translation provided by WIPO.

International Preliminary Report on Patentability from PCT/CN2019/079666, dated Oct. 6, 2020, with English translation provided by WIPO.

First Office Action and Search Report from CN app. No. 201810301996.8, dated Mar. 26, 2021, with English translation from Global Dossier.

Extended European Search Report from EP app. No. 19781730.7, dated May 10, 2021.

"3rd Generation Partnership Project; Technical Specification Group Radio Access Network; Evolved Universal Terrestrial Radio Access (E-UTRA); Physical layer procedures (Release 15)", 3GPP TS 36.213 V15.1.0, Mar. 2018.

"3rd Generation Partnership Project; Technical Specification Group Radio Access Network; NR; Multiplexing and channel coding", 3GPP TS 38.212 V15.0.0, Dec. 2012.

"Discussion on resource allocation and TBS determination", R1-1719929, 3GPP TSG RAN WG1 Meeting 91, Reno, USA, Nov. 27-Dec. 1, 2017.

"DL/UL Resource Allocation", R1-1800875, 3GPP TSG-RAN WG1 Meeting AH 1801, Vancouver, Canada, Jan. 22-26, 2018.

"Remaining issues on DCI contents and formats", R1-1801337, 3GPP TSG RAN WG1 Meeting #92, Athens, Greece, Feb. 26-Mar. 2, 2018.

"Open issues on DCI contents and formats", R1-1801730, 3GPP TSG RAN WG1 Meeting #92, Athens, Greece, Feb. 26-Mar. 2, 2018.

Notice of Reasons for Refusal from JP app. No. 2020-552281, dated Nov. 2, 2021, with English translation from Global Dossier, all pages.

* cited by examiner

```
┌─────────────────────────────────────────────────────────────┐
│ Transmitting DCI including resource allocation indication   │
│ information to UE, where the resource allocation indication │ S110
│ information is used for indicating a resource location of a │
│ frequency domain resource allocated to the UE, and the      │
│ frequency domain resource is allocated by using a VRB       │
│ group as allocation granularity                             │
└─────────────────────────────────────────────────────────────┘
```

Fig. 1

```
┌─────────────────────────────────────────────────────────────┐
│ Receiving DCI that is transmitted by a base station and     │
│ includes resource allocation indication information, where  │ S210
│ the resource allocation indication information is used for  │
│ indicating a resource location of a frequency domain        │
│ resource allocated to the UE, the frequency domain resource │
│ is allocated by using a VRB group as allocation granularity │
└─────────────────────────────────────────────────────────────┘
                              │
                              ▼
┌─────────────────────────────────────────────────────────────┐
│ Determining, according to the resource allocation           │ S220
│ indication information, the frequency domain resource       │
│ allocated by the base station to the UE                     │
└─────────────────────────────────────────────────────────────┘
```

RESOURCE ALLOCATION METHOD AND APPARATUS, BASE STATION, AND USER EQUIPMENT

CROSS-REFERENCE TO RELATED APPLICATIONS

The present application is a U.S. national phase application of a PCT Application No. PCT/CN2019/079666 filed on Mar. 26, 2019, which claims a priority to Chinese Patent Application No. 201810301996.8 filed in China on Apr. 4, 2018, the disclosures of which are incorporated in their entireties by reference herein.

TECHNICAL FIELD

The present disclosure relates to the field of wireless communication technology, in particular to a resource allocation method and apparatus, a base station, and user equipment (UE).

BACKGROUND

In a resource allocation scheme in the related art, downlink control information (DCI) carries information used for indicating the length of a bitfield for data transmission frequency domain resource allocation. The length of the bitfield for data transmission frequency domain resource allocation indicated in the DCI is usually determined by the size of a current scheduling bandwidth.

According to conventional resource allocation methods, frequency domain resource allocation has fixed granularity, and a flexible configuration or adjustment of resource allocation granularity is not supported. However, in a future mobile communication system, a scheduling bandwidth needs to be adaptable to configurations of a base station. If uniform resource allocation granularity is used, the flexibility of scheduling is limited. Therefore, different service types require different resource allocation granularities.

SUMMARY

An object of the present disclosure is to provide a resource allocation method and apparatus, a base station, and UE, to resolve the problem that resource allocation methods in the related art cannot support the flexible configuration or adjustment of resource allocation granularity.

To achieve the foregoing object, the present disclosure provides a resource allocation method, applied to a base station, including:

transmitting DCI including resource allocation indication information to UE, where the resource allocation indication information is used for indicating a resource location of a frequency domain resource allocated to the UE, and the frequency domain resource is allocated by using a virtual resource block (VRB) group as allocation granularity.

Optionally, the resource allocation method further includes:

informing the UE of a size of the VRB group by using higher layer signaling or Layer 1 (L1) signaling carried in a group common physical downlink control channel (PDCCH).

Optionally, the resource allocation method further includes:

determining the size of the VRB group based on a size of a current system bandwidth or activated bandwidth part (BWP) and a predetermined correspondence between system bandwidth or activated BWP sizes and VRB group sizes.

Optionally, the resource allocation method further includes: determining a quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of physical resource blocks (PRBs) or VRBs in a current system bandwidth or activated BWP, and G is an integer greater than or equal to 1.

The present disclosure further provides in some embodiments a resource allocation method, applied to UE, including:

receiving DCI that is transmitted by a base station and includes, resource allocation indication information, where the resource allocation indication information is used for indicating a resource location of a frequency domain resource allocated to the UE, and the frequency domain resource is allocated by using a VRB group as allocation granularity; and determining, according to the resource allocation indication information, the frequency domain resource allocated by the base station to the UE.

Optionally, the resource allocation method further includes: acquiring, by using higher layer signaling or Layer 1 (L1) signaling carried in a group common physical downlink control channel (PDCCH), a size of the VRB group indicated by the base station.

Optionally, the resource allocation method further includes:

determining the size of the VRB group based on the size of a current system bandwidth or activated BWP and a predetermined correspondence between system bandwidth or activated BWP sizes and VRB group sizes.

Optionally, in the resource allocation method, the determining, according to the resource allocation indication information, the frequency domain resource allocated by the base station to the UE includes:

determining a quantity of bits of the resource allocation indication information according to the size of the VRB group and the size of a current system bandwidth or activated BWP; and determining, according to the resource allocation indication information, a VRB group allocated by the base station.

Optionally, in the resource allocation method, in the determining the quantity of bits of the resource allocation indication information according to the size of the VRB group and the size of the current system bandwidth or activated BWP, the quantity of bits of the resource allocation indication information is determined by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

The present disclosure further provides in some embodiments a base station, including a storage, a processor, a transceiver, and a computer program stored in the storage and configured to be executed by the processor, where the transceiver is configured to:
  transmit DCI including resource allocation indication information to UE, where the resource allocation indication information is used for indicating a resource location of a frequency domain resource allocated to the UE, and the frequency domain resource is allocated by using a VRB group as allocation granularity.

Optionally, in the base station, the transceiver is further configured to:
  inform the UE of a size of the VRB group by using higher layer signaling or L1 signaling carried in a group common PDCCH.

Optionally, in the base station, the processor is configured to:
  determine the size of the VRB group based on a size of a current system bandwidth or activated BWP and a predetermined correspondence between system bandwidth or activated BWP sizes and VRB group sizes.

Optionally, in the base station, the processor is configured to determine a quantity of bits of the resource allocation indication information by using Formula 1 or Formula 2:

$$\lceil \log_2(\lfloor N_{RB}^{DL,BWP}/G \rfloor(\lfloor N_{RB}^{DL,BWP}/G \rfloor+1)/2) \rceil, \quad \text{Formula 1}$$

$$\lceil \log_2(\lceil N_{RB}^{DL,BWP}/G \rceil(\lceil N_{RB}^{DL,BWP}/G \rceil+1)/2) \rceil, \quad \text{Formula 2}$$

where G is the size of the VRB group, $N_{RB}^{DL,BWP}$ is a quantity of PRBs or VRBs in a current system bandwidth or activated BWP, and G is an integer greater than or equal to 1.

The present disclosure further provides in some embodiments UE, including a storage, a processor, a transceiver, and a computer program stored in the storage and configured to be executed by the processor, where
  the transceiver is configured to receive DCI that is transmitted by a base station and includes resource allocation indication information, where the resource allocation indication information is used for indicating a resource location of a frequency domain resource allocated to the UE, and the frequency domain resource is allocated by using a VRB group as allocation granularity; and
  the processor is configured to determine, according to the resource allocation indication information, the frequency domain resource allocated by the base station to the UE.

Optionally, in the UE, the transceiver is further configured to:
  acquire, by using higher layer signaling or L1 signaling carried in a group common PDCCH, a size of the VRB group indicated by the base station.

Optionally, in the UE, the processor is further configured to:
  determine the size of the VRB group based on a size of a current system bandwidth or activated BWP and a predetermined correspondence between system bandwidth or activated BWP sizes and VRB group sizes.

Optionally, in the UE, the processor is further configured to:
  determine a quantity of bits of the resource allocation indication information according to the size of the VRB group and the size of a current system bandwidth or activated BWP; and
  determine, according to the resource allocation indication information, a VRB group allocated by the base station.

Optionally, in the UE, the processor is configured to determine the quantity of bits of the resource allocation indication information by using Formula 1 or Formula 2:

$$\lceil \log_2(\lfloor N_{RB}^{DL,BWP}/G \rfloor(\lfloor N_{RB}^{DL,BWP}/G \rfloor+1)/2) \rceil, \quad \text{Formula 1}$$

$$\lceil \log_2(\lceil N_{RB}^{DL,BWP}/G \rceil(\lceil N_{RB}^{DL,BWP}/G \rceil+1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

The present disclosure further provides in some embodiments a resource allocation apparatus, applied to a base station, including:
  a transmission module, configured to transmit DCI including resource allocation indication information to UE, where the resource allocation indication information is used for indicating a resource location of a frequency domain resource allocated to the UE, and the frequency domain resource is allocated by using a VRB group as allocation granularity.

Optionally, in the resource allocation apparatus, the transmission module is further configured to:
  inform the UE of a size of the VRB group by using higher layer signaling or L1 signaling carried in a group common PDCCH.

Optionally, the resource allocation apparatus further includes:
  a first processing module, configured to determine the size of the VRB group based on a size of a current system bandwidth or activated BWP and a predetermined correspondence between system bandwidth or activated BWP sizes and VRB group sizes.

Optionally, the resource allocation apparatus further includes:
  a second processing module, configured to determine a quantity of bits of the resource allocation indication information by using Formula 1 or Formula 2:

$$\lceil \log_2(\lfloor N_{RB}^{DL,BWP}/G \rfloor(\lfloor N_{RB}^{DL,BWP}/G \rfloor+1)/2) \rceil, \quad \text{Formula 1}$$

$$\lceil \log_2(\lceil N_{RB}^{DL,BWP}/G \rceil(\lceil N_{RB}^{DL,BWP}/G \rceil+1)/2) \rceil, \quad \text{Formula 2}$$

where G is the size of the VRB group, $N_{RB}^{DL,BWP}$ is a quantity of PRBs, or VRBs in a current system bandwidth or activated BWP, and G is an integer greater than or equal to 1.

The present disclosure further provides in some embodiments a resource allocation apparatus, applied to UE, including:
  a receiving module, configured to receive DCI that is transmitted by a base station and includes resource allocation indication information, where the resource allocation indication information is used for indicating a resource location of a frequency domain resource allocated to the UE, and the frequency domain resource is allocated by using a VRB group as allocation granularity; and
  a determination module, configured to determine, according to the resource allocation indication information, the frequency domain resource allocated by the base station to the UE.

Optionally, in the resource allocation apparatus, the receiving module is further configured to:
  acquire, by using higher layer signaling or L1 signaling carried in a group common PDCCH, a size of the VRB group indicated by the base station.

Optionally, in the resource allocation apparatus, the determination module is further configured to:

determine the size of the VRB group based on a size of a current system bandwidth or activated BWP and a predetermined correspondence between system bandwidth or activated BWP sizes and VRB group sizes.

Optionally, in the resource allocation apparatus, the determination module is further configured to:

determine a quantity of bits of the resource allocation indication information according to the size of the VRB group and the size of a current system bandwidth or activated BWP; and determine, according to the resource allocation indication information, a VRB group allocated by the base station.

Optionally, in the resource allocation apparatus, the determination module is configured to determine the quantity of bits of the resource allocation indication information by using Formula 1 or Formula 2:

$$\lceil \log_2(\lfloor N_{RB}^{DL,BWP}/G \rfloor(\lfloor N_{RB}^{DL,BWP}/G \rfloor+1)/2) \rceil, \quad \text{Formula 1}$$

$$\lceil \log_2(\lceil N_{RB}^{DL,BWP}/G \rceil(\lceil N_{RB}^{DL,BWP}/G \rceil+1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

The present disclosure further provides in some embodiments a computer-readable storage medium storing therein a computer program, where the computer program is configured to be executed by a processor to implement the steps of the resource allocation methods as described above.

The foregoing technical solutions of the present disclosure at least have the following beneficial effects.

In the resource allocation method in the embodiments of the present disclosure, by allocating data transmission resource to UE in units of VRB group, and indicating the size of the allocated VRB group to the UE, a quantity of bits of resource allocation indication information may be determined according to the size of the VRB group and may be adjusted according to the site of a current system bandwidth or BWP, rather than being limited to the resource allocation granularity at the PPB level. Therefore, the flexible configuration or adjustment of resource allocation granularity can be supported, thereby resolving the problem that resource allocation methods in the related art cannot support the flexible configuration or adjustment of resource allocation granularity.

DETAILED DESCRIPTION

To make the technical problems, the technical solutions, and advantages of the present disclosure clearer, detailed descriptions are provided below with reference to the accompanying drawings and specific embodiments.

In view of the problem in the related art that a length of the bitfield for data transmission frequency domain resource allocation indicated in DCI is usually determined by the sire of a current scheduling bandwidth and, as a result, the flexible configuration or adjustment of resource allocation granularity cannot be supported, a resource allocation method is provided in the present disclosure, wherein, by allocating data transmission resource to UE in units of VRB group and indicating the size of the allocated VRB group to the UE, resource allocation granularity for the UE may be flexibly configured or adjusted.

Figure 1:
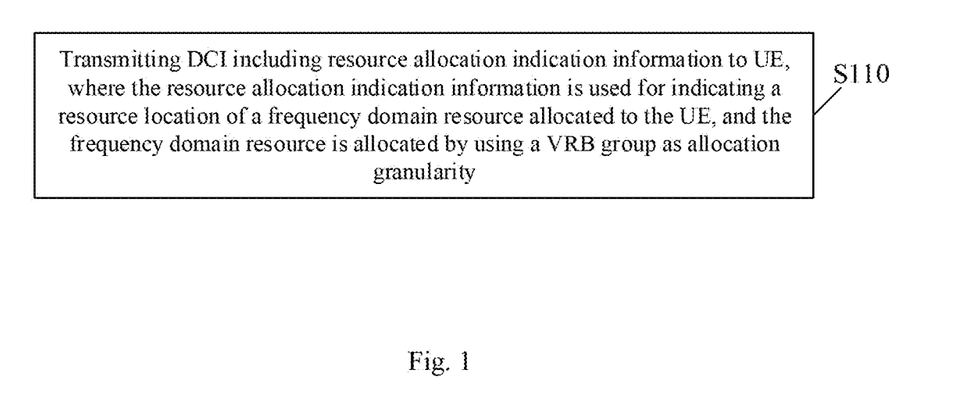
FIG. 1 is a first flowchart of a resource allocation method according to an embodiment of the present disclosure.

FIG. 1 is a flowchart of a resource allocation method according to an embodiment of the present disclosure. Referring to FIG. 1, the resource allocation method in the embodiment of the present disclosure, when applied to a base station, includes the following steps.

A step S110 includes: transmitting DCI including resource allocation indication information to UE, where the resource allocation indication information is used for indicating a resource location of a frequency domain resource allocated to the UE, and the frequency domain resource is allocated by using a VRB group as allocation granularity.

In embodiments of the present disclosure, the size of the VRB group is an integer greater than or equal to 1, and represents the size of one VRB group allocated by the base station, that is, a quantity of VRBs included in one VRB group.

In another aspect, in embodiments of the present disclosure, the resource allocation method further includes: transmitting the size of the VRB group to the UE by means of explicit signaling, so that the UE acquires the size of the VRB group, and can determine, according to the size of the VRB group and the resource allocation indication information, the frequency domain resource allocated by the base station to the UE. Optionally in embodiments of the present disclosure, the base station may inform the UE of the size of the VRB group by using higher layer signaling or L1 signaling carried in a group common PDCCH.

Further, the size of the VRB group may be a predefined value. There is a predetermined correspondence between current system bandwidth or activated BWP sizes and VRB group sizes, and the size of the VRB group is determined according to the size of the current system bandwidth or activated MVP and the predetermined correspondence.

In embodiments of the present disclosure, the resource allocation method further includes: determining a quantity of bits of the resource allocation indication information in the step S110 by using the following Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

Specifically, G is the size of the VRB group, and $N_{RB}^{DL,BWP}$ is a quantity of PRBs or VRBs in the current system bandwidth or activated BWP.

Based on the values of the foregoing configured parameters, the value calculated by using Formula 1 or Formula 2 is the quantity of bits of the resource allocation indication information in the step S110.

In addition, when the quantity of bits of the resource allocation indication information is determined by using Formula 2, the size of each of m resource units allocated by the base station to the UE is the size G of the VRB group. That is, in the m resource units, each resource unit includes one VRB group. Each VRB group includes G VRBs. The size of a remaining resource unit is:

$$\lceil \log_2(\lceil N_{RB}^{DL,BWP}/G \rceil (\lceil N_{RB}^{DL,BWP}/G \rceil +1)/2) \rceil (G - N_{RB}^{DL,BWP},$$

where m is calculated as follows: $\lfloor \log_2(|N_{RB}^{DL,BWP}/G| (|N_{RB}^{DL,BWP}/G|+1)/2)| -1$. Similarly, same as those in Formula 1 and Formula 2, G is the size of the VRB group, and $N_{RB}^{DL,BWP}$ is a quantity of PRBs or VRBs in the current system bandwidth or activated BWP.

In the resource allocation method in the embodiments of the present disclosure, during the allocation of a data transmission resource to UE, a VRB group is used as the basic unit of resource allocation; a quantity of bits of resource allocation indication information included in DCI is determined according to the determined size G of the VRB group, and is used for indicating the allocation of a frequency domain resource. Therefore, the quantity of bits of the resource allocation indication information may be determined according to the size G of the VRB group, and may be adjusted according to the size of a current system bandwidth or activated BWP and may be adjusted according to the bearer size of DCI, rather than being limited to the resource allocation granularity at the PRB level. Therefore, the flexible configuration or adjustment of resource allocation granularity can be supported, thereby resolving the problem that resource allocation methods in the related art cannot support the flexible configuration or adjustment of resource allocation granularity.

Optionally, in the resource allocation method in the embodiments of the present disclosure, the DCI indicates, by using the resource allocation indication information, consecutive VRB groups allocated to the UE for data transmission.

Optionally, in the resource allocation method in the embodiments of the present disclosure, the base station and the UE may agree in advance with regard to a manner of determining the quantity of bits of the resource allocation indication information in the DCI.

Figure 2:
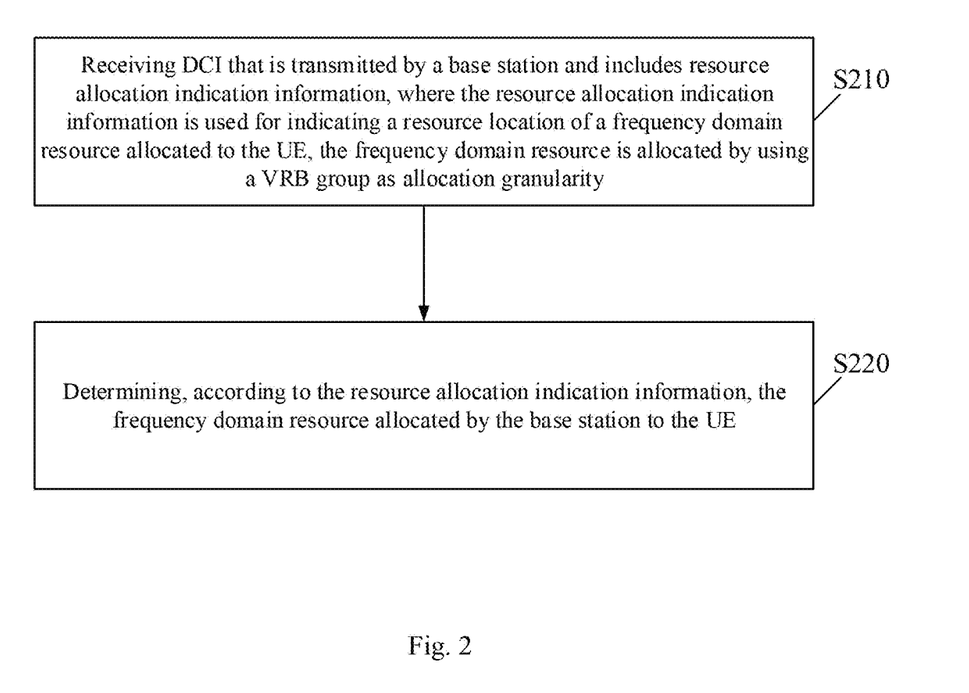
FIG. 2 is a second flowchart of a resource allocation method according to an embodiment of the present disclosure.

FIG. 2 is another flowchart of a resource allocation method according to an embodiment of the present disclosure. Referring to FIG. 2, the resource allocation method in the embodiments of the present disclosure, when applied to UE, includes the following steps.

A step S210 includes: receiving DCI that is transmitted by a base station and includes resource allocation indication information, where the resource allocation indication information is used for indicating a resource location of a frequency domain resource allocated to the UE, the frequency domain resource is allocated by using a VRB group as allocation granularity.

A step S220 includes: determining, according to the resource allocation indication information, the frequency domain resource allocated by the base station to the UE.

By means of the resource allocation method in the embodiments of the present disclosure, UE determines, according to resource allocation indication information carried in DCI, a VRB group allocated by the base station to the UE.

In addition, in an implementation of the embodiments of the present disclosure, UE may acquire the size of the VRB group in advance via explicit signaling transmitted by the base station, so as to determine the frequency domain resource allocated by the base station to the UE according to the size of the VRB group and the resource allocation indication information.

Specifically, the UE may acquire, by using higher layer signaling or L1 signaling carried in a group common PDCCH, the size of the VRB group indicated by the base station.

In another implementation of the embodiments of the present disclosure, the size of the VRB group may be a predefined value. There is a predetermined correspondence between current system bandwidth or activated BWP sizes and VRB group sizes, and the size of the VRB group is determined according to the size of current system bandwidth or activated BWP and the predetermined correspondence.

Therefore, the method may further include:
determining the size of the VRB group according to the size of the current system bandwidth or activated BWP and the predetermined correspondence between system bandwidth or BWP sizes and VRB group sizes.

Figure 3:
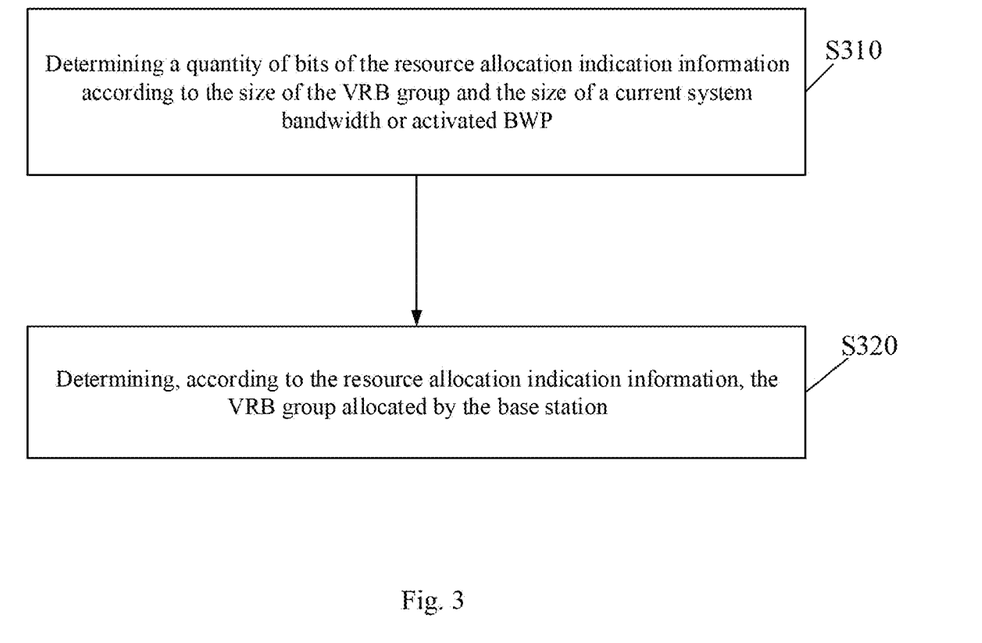
FIG. 3 is a flowchart of a part of a resource allocation method according to an embodiment of the present disclosure.

Further, as shown in FIG. 3, with reference to FIG. 2, after the step S210, the method may further include the following steps.

A step S310 includes: determining a quantity of bits of the resource allocation indication information according to the size of the VRB group and the size of a current system bandwidth or activated BWP.

A step S320 includes: determining, according to the resource allocation indication information, the VRB group allocated by the base station.

Specifically, in step S310, the quantity of bits of the resource allocation indication information may be determined by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

According to values of the foregoing configured parameters, the value calculated by using Formula 1 or Formula 2 is the quantity of bits of the resource allocation indication information in the step S310. Further, the complete resource allocation indication information can be obtained according to a start location of the resource allocation indication information in the DCI.

For example, when the system bandwidth or BWP in which UE transmits data includes 11 PRBs, the frequency domain resources that are indicated by the base station by using the resource allocation indication information and allocated to the UE are consecutive VRB groups, and the UE acquires, by using higher layer signaling, that the size G of the VRB group is equal to 2, according to the size G of the VRB group allocated by the base station being equal to 2 and the size of the system bandwidth or activated BWP, the determination of the length (the quantity of bits) of the resource allocation indication information may be implemented by a calculation using the following formula:

$$\lceil \log_2(\lfloor N_{RB}^{DL,BWP}/G \rfloor (\lfloor N_{RB}^{DL,BWP}/G \rfloor+1)/2) \rceil.$$

That is, when using the foregoing Formula 1, it is calculated that the quantity of bits of the resource allocation indication information is four.

Figure 4:
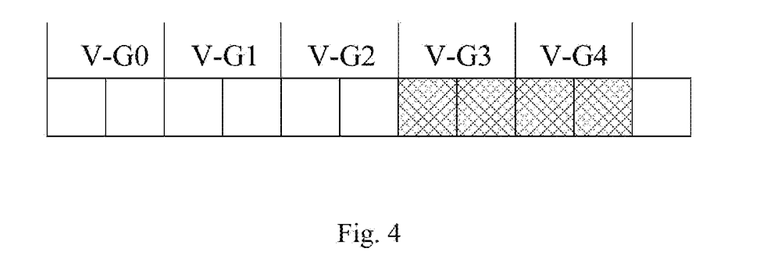
FIG. 4 is a first schematic diagram of resources allocated by using a resource allocation method according to an embodiment of the present disclosure.
Figure 11:
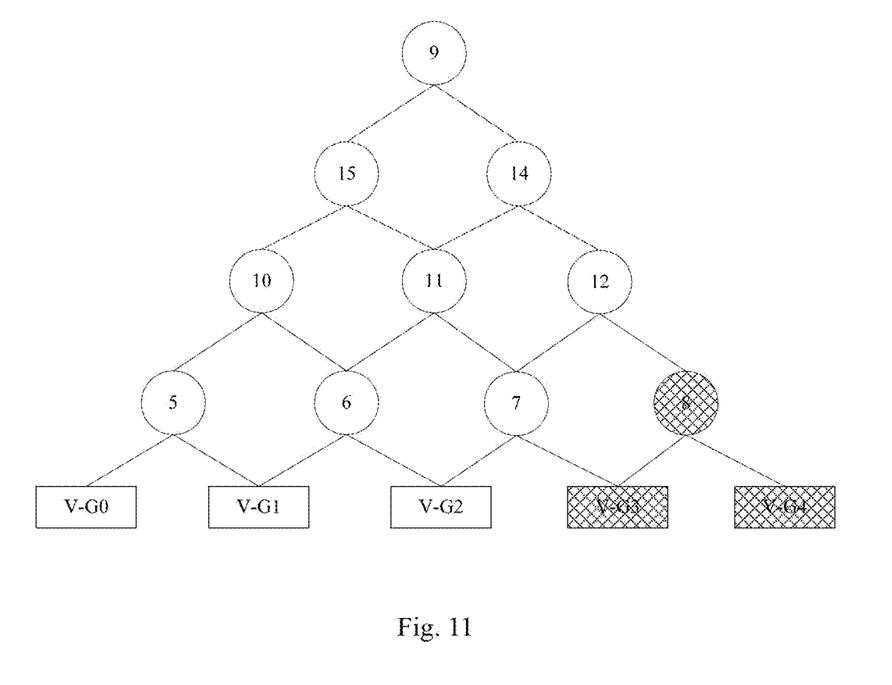
FIG. 11 is a first schematic diagram of VRBs.

Further, when the resource allocation indication information is 1000, that is, 8 in decimal, according to a resource mapping relationship between VRB and PRB, it can be determined that the resource allocated by the base station by using the resource allocation indication information in the DCI is as shown in FIG. 4. With reference to FIG. 11, the base station associates, by using a joint coding, the start locations and the quantity of allocated VRB groups with a number in a one-to-one correspondence. The UE determines the start locations of the VRB groups and the quantity of the allocated VRB groups according to the resource allocation indication information, so as to determine a specific resource allocation. With reference to FIG. 4 and FIG. 11, it may be determined that the resources allocated by the base station to the UE are a VRB group #3 and a VRB group #4.

A person skilled in the art should be aware of the aforementioned resource mapping relationship between VRB and PRB and the coding scheme of VRB, and therefore can understand, according to the content of the technical solutions of the present disclosure, a specific manner of determining, according to the resource allocation indication information, the VRB group allocated by the base station to the UE by means of the method in the embodiments of the present disclosure. Details are not described herein again.

In another implementation of the method in the embodiments of the present disclosure, when the system bandwidth or activated BWP in which UE transmits the data includes 11 PRBs, and the UE acquires, by using higher layer signaling, that the size G of the VRB group is equal to 2, the determination of the length (the quantity of bits) of the resource allocation indication information may be implemented by a calculation using the following formula:

$$\lceil \log_2(\lceil N_{RB}^{DL,BWP}/G \rceil (\lceil N_{RB}^{DL,BWP}/G \rceil+1)/2) \rceil.$$

That is, when using the foregoing Formula 2, it is calculated that the quantity of bits of the resource allocation indication information is five.

Figure 5:
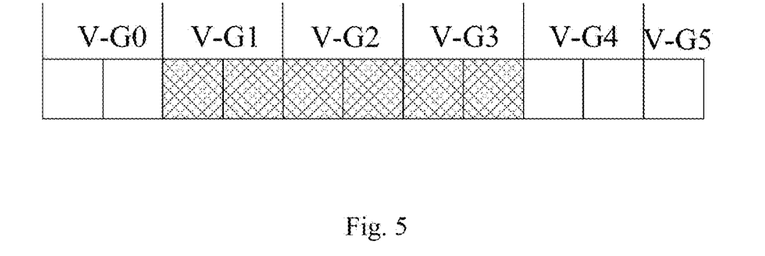
FIG. 5 is a second schematic diagram of resources allocated by using a resource allocation method according to an embodiment of the present disclosure.
Figure 6:
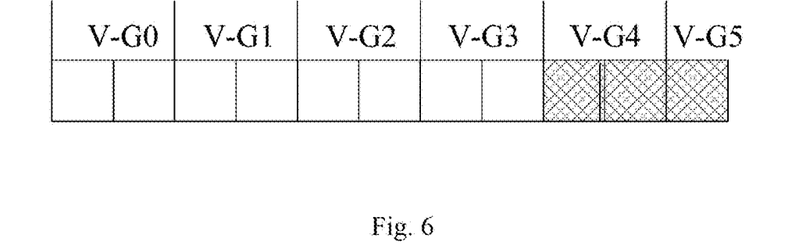
FIG. 6 is a third schematic diagram of resources allocated by using a resource allocation method according to an embodiment of the present disclosure.
Figure 12:
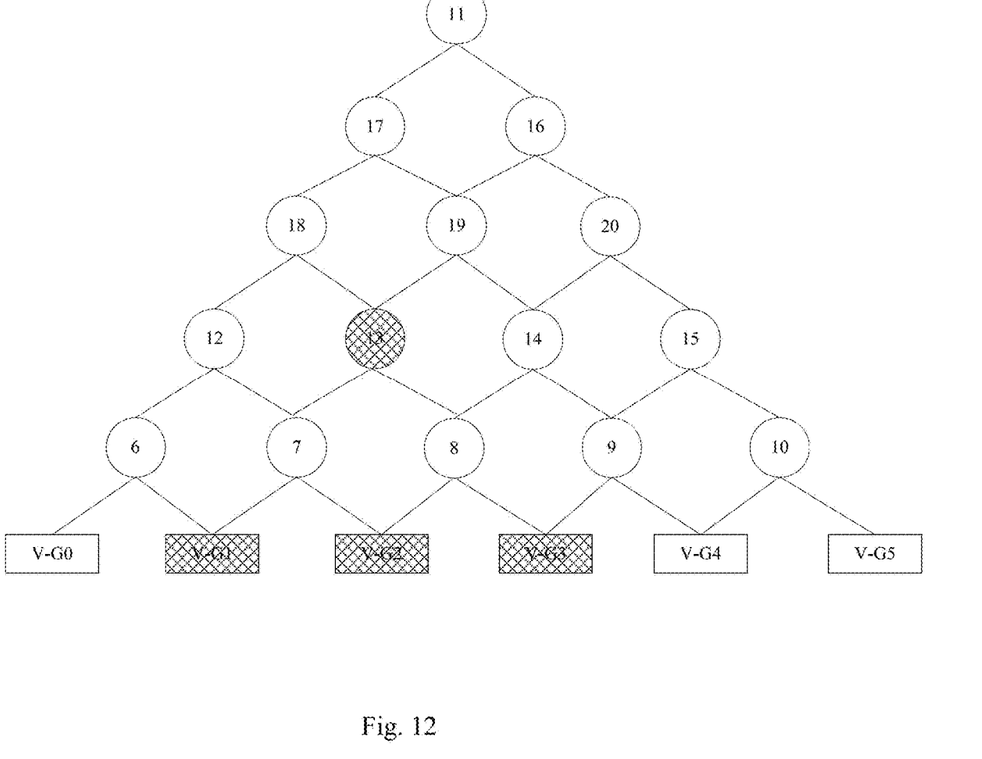
FIG. 12 is a second schematic diagram of VRBs.

In this case, if the resource allocation indication information is 01101, that is, 13 in decimal, according to the resource mapping relationship between VRB and PRB, it can be determined that the resources allocated by the base station by using the resource allocation indication information in the DCI are as shown in FIG. 5. With reference to FIG. 12, the base station associates, by using a joint coding, the start locations and the quantity of allocated VRB groups with a number in a one-to-one correspondence. The UE determines the start locations of the VRB groups and the quantity of the allocated VRB groups according to the indication information, so as to determine a specific resource allocation. As shown in FIG. 5, the resources allocated by the base station to the UE are a VRB group #1, a VRB group #2, and a VRB group #3. If the resource allocation indication information is 01010, that is, 10 in decimal, according to the resource mapping relationship between VRB and PRB, it can be determined that the resources allocated by the base station by using the resource allocation indication information in the DCI are as shown in FIG. 6. According to the foregoing principle, it may be determined that the resources allocated by the base station to the UE are a VRB group #4 and VRB group #5.

In the foregoing description, according to the resource allocation method in the embodiments of the present disclosure, specific manners of determining the length of resource allocation indication information and further determining a frequency domain resource allocated by the base station to the UE in different ways are described in details by assuming that the size of a VRB group is acquired by using higher layer signaling, and giving for example quantities of PRBs included in a system bandwidth or activated BWP in which UE transmits data. Based on the foregoing principle, a person skilled in the art should be able to appreciate specific implementations of the resource allocation method according to the embodiments of the present disclosure in various application scenarios, which are not described herein in details.

Figure 7:
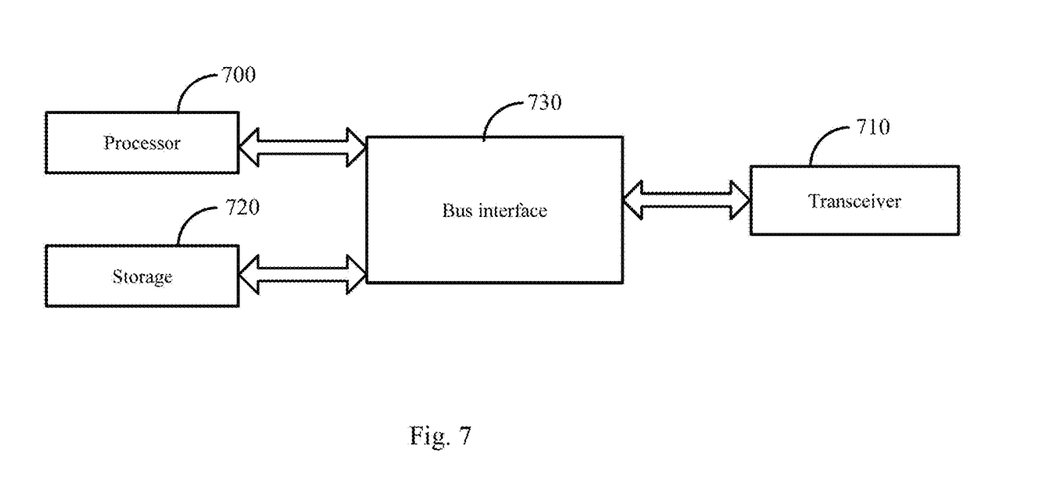
FIG. 7 is a schematic structural diagram of a base station according to an embodiment of the present disclosure.

FIG. 7 is a schematic structural diagram of a base station according to an embodiment of the present disclosure. The base station includes: a processor 700, a storage 720 connected to the processor 700 by a bus interface 730, and a transceiver 710 connected to the processor 700 by the bus interface. The storage 720 is configured to store a program and data used by the processor when performing operations. The transceiver 710 is configured to transmit data information or a preamble, and further receive an uplink control channel. When the processor 700 invokes and executes the program and data stored in the storage 720, the following functional modules are implemented: the processor 700 is configured to read the program in the storage 720, and the transceiver 710 is configured to perform the following process:

transmitting DCI including resource allocation indication information to UE, where the resource allocation indication information is used for indicating a resource location of a frequency domain resource allocated to the UE, the frequency domain resource is allocated by using a VRB group as allocation granularity.

Optionally, in embodiments of the present disclosure, the transceiver 710 is further configured to:

inform the UE of the size of the VRB group by using higher layer signaling or L1 signaling carried in a group common PDCCH.

In embodiments of the present disclosure, the transceiver 710 is further configured to:

determine the size of the VRB group according to the size of a current system bandwidth or activated BWP and a predetermined correspondence between system bandwidth or activated BWP sizes and VRB group sizes.

Further, the processor 700 is configured to:

determine a quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor+1)/2) \rceil, \quad \text{Formula 1}$$

$$\lceil \log_2(\lceil N_{RB}^{DL,BWP}/G \rceil (\lceil N_{RB}^{DL,BWP}/G \rceil+1)/2) \rceil, \quad \text{Formula 2}$$

where G is the size of the VRB group, $N_{RB}^{DL,BWP}$ is a quantity of PRBs or VRBs in a current system bandwidth or activated BWP, and G is an integer greater than or equal to 1.

In addition, in FIG. 7 a bus architecture may include any quantity of interconnected buses and bridges. Specifically, various circuits such as one or more processors represented by the processor 700 and a storage represented by the storage 720 are linked together. The bus architecture may also link various other circuits such as peripherals, voltage regulators, and power management circuits, which are well known in the art, and therefore are not further described herein. The bus interface provides an interface. The transceiver 710 may include a plurality of elements, that is, a transmitter and a receiver, to provide units for communicating with various other apparatuses over a transmission medium. The processor 700 is responsible for managing the bus architecture and general processing. The storage 720 can store data used by the processor 700 while performing operations.

A person skilled in the art may understand that all or some of the steps of the embodiments may be implemented by hardware or a computer program instructing relevant hardware. The computer program includes instructions for performing some or all steps in the foregoing method. The computer program may be stored in a readable storage medium. The storage medium may be a storage medium in any form.

The base station provided in the embodiments of the present disclosure may perform the foregoing method embodiments and has similar principle and technical effects. Details thereof are not described herein again in this embodiment.

Figure 8:
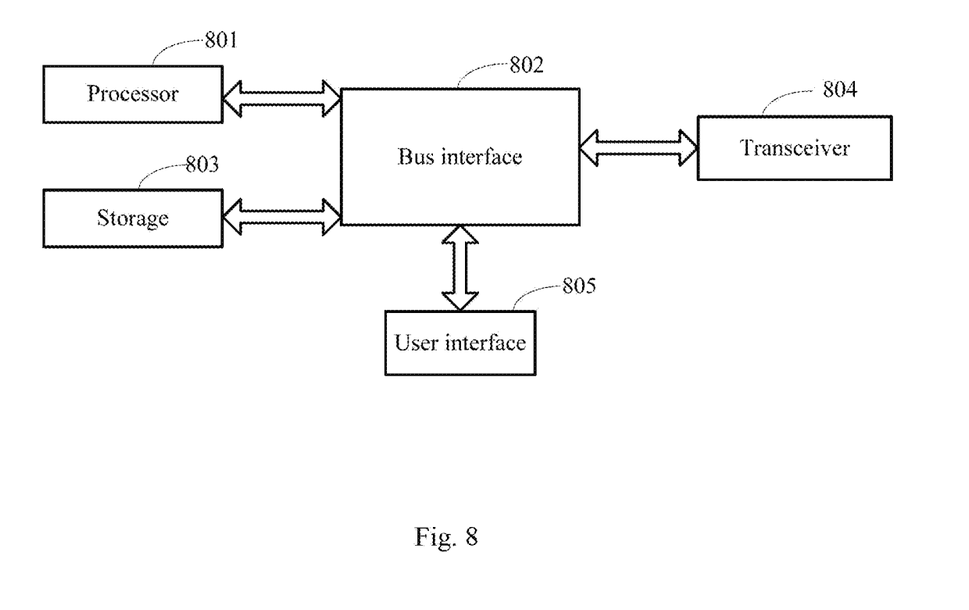
FIG. 8 is a schematic structural diagram of UE according to an embodiment of the present disclosure.

FIG. 8 is a schematic structural diagram of UE according to an embodiment of the present disclosure. The UE includes: a processor 801, a storage 803 connected to the processor 801 by a bus interface 802, and a transceiver 804 connected to the bus interface 802. The storage 803 is configured to store a program and data used by the processor 801 when performing operations. The processor 801 invokes and executes the program and data stored in the storage 803. The transceiver 804 is configured to receive and transmit data under the control of the processor 801.

In embodiments of the present disclosure, the transceiver 804 is configured to receive DCI that is transmitted by a base station and includes resource allocation indication information, where the resource allocation indication information is used for indicating a resource location of a frequency domain resource allocated to the UE, the frequency domain resource is allocated by using a VRB group as allocation granularity.

The processor 801 is configured to determine, according to the resource allocation indication information, the frequency domain resource allocated by the base station to the UE.

Optionally, the transceiver 804 is further configured to:
acquire, by using higher layer signaling or L1 signaling carried in a group common PDCCH, the size of the VRB group indicated by the base station.

Optionally, the processor 801 is further configured to:
determine the size of the VRB group according to the size of a current system bandwidth or activated BWP and a predetermined correspondence between system bandwidth or activated BWP sizes and VRB group sizes.

Optionally, the processor 801 is further configured to:
determine a quantity of bits of the resource allocation indication information according to the size of the VRB group and the size of a current system bandwidth or activated BWP; and
determine, according to the resource allocation indication information, the VRB group allocated by the base station.

Optionally, the processor 801 is configured to determine the quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

It needs to be noted that, in FIG. 8, a bus architecture may include any quantity of interconnected buses and bridges. Specifically, various circuits such as one or more processors represented by the processor 801 and a storage represented by the storage 803 are linked together. The bus architecture may also link various other circuits such as peripherals, voltage regulators, and power management circuits, which are well known in the art, and therefore are not further described herein. The bus interface provides an interface. The transceiver 804 may include a plurality of elements, that is, a transmitter and a receiver, to provide units for communicating with various other apparatuses over a transmission medium. For different UEs, a user interface 805 may be an interface capable of externally/internally connecting desired devices, including, but not limited to, a keypad, a display, a speaker, a microphone, and a joystick. The processor 801 is responsible for managing the bus architecture and general processing. The storage 803 can store data used by the processor 801 while performing operations.

A person skilled in the art may understand that all or some of the steps of the embodiments may be implemented by hardware or a computer program instructing relevant hardware. The computer program includes instructions for performing some or all steps in the foregoing method. The computer program may be stored in a readable storage medium. The storage medium may be a storage medium in any form.

The UE provided in the embodiments of the present disclosure may perform the foregoing method embodiments and has similar principle and technical effects. Details thereof are not described herein again.

Figure 9:
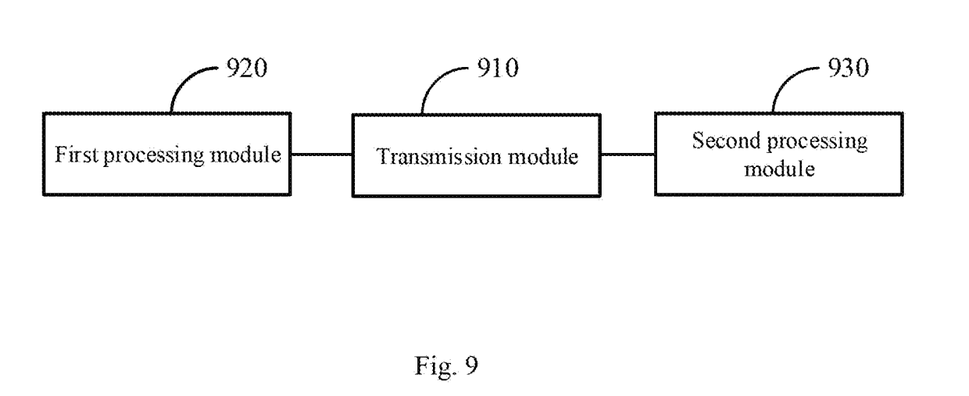
FIG. 9 is a first schematic structural diagram of a resource allocation apparatus according to an embodiment of the present disclosure.

The present disclosure further provides in a specific embodiment a resource allocation apparatus, applied to a base station. As shown in FIG. 9, the apparatus includes:
a transmission module 910, configured to transmit DCI including resource allocation indication information to UE, where the resource allocation indication information is used for indicating a resource location of a frequency domain resource allocated to the UE, the frequency domain resource is allocated by using a VRB group as allocation granularity.

Optionally, the transmission module 910 is further configured to:
inform the UE of the size of the VRB group by using higher layer signaling or L1 signaling carried in a group common PDCCH.

Optionally, as shown in FIG. 9, the base station further includes:
a first processing module 920, configured to determine the size of the VRB group according to the size of a current system bandwidth or activated BWP and a predetermined correspondence between system bandwidth or activated BWP sizes and VRB group sizes.

In embodiments of the present disclosure, optionally the base station further includes:

a second processing module 930, configured to determine a quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of PRBs or VRBs in a current system bandwidth or activated BWP, and G is an integer greater than or equal to 1.

Figure 10:
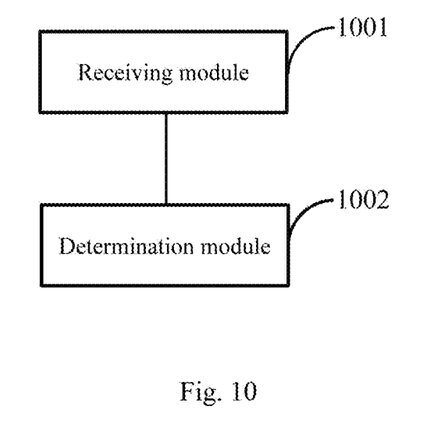
FIG. 10 is a second schematic structural diagram of a resource allocation apparatus according to an embodiment of the present disclosure.

The present disclosure further provides in a specific embodiment a resource allocation apparatus, applied to UE. As shown in FIG. 10, the apparatus includes:

a receiving module 1001, configured to receive DCI that is transmitted by a base station and includes resource allocation indication information, where the resource allocation indication information is used for indicating a resource location of a frequency domain resource allocated to the UE, the frequency domain resource is allocated by using a VRB group as allocation granularity; and a determination module 1002, configured to determine, according to the resource allocation indication information, the frequency domain resource allocated by the base station to the UE.

In embodiments of the present disclosure, optionally, the receiving module 1001 is further configured to:

acquire, by using higher layer signaling or L1 signaling carried in a group common PDCCH, the size of the VRB group indicated by the base station.

Optionally, the determination module 1002 is further configured to:

determine the size of the VRB group according to the size of a current system bandwidth or activated BWP and a predetermined correspondence between system bandwidth or activated BWP sizes and VRB group sizes.

Optionally, the determination module 1002 is further configured to:

determine a quantity of bits of the resource allocation indication information according to the size of the VRB group and the size of a current system bandwidth or activated BWP; and determine, according to the resource allocation indication information, the VRB group allocated by the base station.

Optionally, the determination module 1002 is configured to determine the quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

where G is the size of the VRB group, $N_{RB}^{DL,BWP}$ is a quantity of PRBs or VRBs in the current system bandwidth or activated BWP, and G is an integer greater than or equal to 1.

In another aspect, the present disclosure further provides in a specific embodiment a computer-readable storage medium, where the computer-readable storage medium stores therein a computer program, and the computer program is configured to be executed by a processor to implement various processes of the embodiments of the foregoing resource allocation method, and can achieve the same technical effects. To avoid repetition, details are not described herein again. The computer-readable storage medium is, for example, a read-only memory (ROM), a random access memory (RAM), a magnetic disk or an optical disc.

According to the foregoing description, a person skilled in the art should be able to appreciate a specific implementation structure of a computer-readable storage medium that implements the resource allocation method in the present disclosure. Details are not described herein.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The computer software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

The above descriptions merely describe preferred implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A resource allocation method, applied to a base station, comprising:

transmitting downlink control information (DCI) comprising resource allocation indication information to user equipment (UE), wherein the resource allocation indication information is used for indicating a resource location of a frequency domain resource allocated to the UE, and the frequency domain resource is allocated by using a virtual resource block (VRB) group as allocation granularity;

wherein the method further comprises:

determining a size of the VRB group based on a size of an activated bandwidth part (BWP) and a predetermined correspondence between activated BWP sizes and VRB group sizes.

2. The resource allocation method according to claim 1, further comprising:
informing the UE of a size of the VRB group by using higher layer signaling or Layer 1 (L1) signaling carried in a group common physical downlink control channel (PDCCH).

3. The resource allocation method according to claim 1, further comprising: determining a quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor + 1)/2) \rceil, \quad \text{Formula 1}$$

$$\lceil \log_2(\lceil N_{RB}^{DL,BWP}/G \rceil (\lceil N_{RB}^{DL,BWP}/G \rceil + 1)/2) \rceil, \quad \text{Formula 2}$$

where G is the size of the VRB group, $N_{RB}^{DL,BWP}$ is a quantity of physical resource blocks (PRBs) or VRBs in the activated bandwidth part (BWP), and G is an integer greater than or equal to 1.

4. A base station, comprising a storage, a processor, a transceiver, and a computer program stored in the storage and configured to be executed by the processor, wherein the transceiver is configured to implement the steps in the resource allocation method according to claim 1.

5. The base station according to claim 4, wherein the transceiver is further configured to:
inform the UE of a size of the VRB group by using higher layer signaling or Layer 1 (L1) signaling carried in a group common physical downlink control channel (PDCCH).

6. The base station according to claim 4, wherein the processor is configured to determine a quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor + 1)/2) \rceil, \quad \text{Formula 1}$$

$$\lceil \log_2(\lceil N_{RB}^{DL,BWP}/G \rceil (\lceil N_{RB}^{DL,BWP}/G \rceil + 1)/2) \rceil, \quad \text{Formula 2}$$

wherein G is a size of the VRB group, $N_{RB}^{DL,BWP}$ is a quantity of physical resource blocks (PRBs) or VRBs in the activated bandwidth part (BWP), and G is an integer greater than or equal to 1.

7. A non-transitory computer-readable storage medium, storing therein a computer program, wherein the computer program is configured to be executed by a processor, to implement the steps in the resource allocation method according to claim 1.

8. A resource allocation method, applied to user equipment (UE), comprising:
receiving downlink control information (DCI) that is transmitted by a base station and comprises resource allocation indication information, wherein the resource allocation indication information is used for indicating a resource location of a frequency domain resource allocated to the UE, and the frequency domain resource is allocated by using a virtual resource block (VRB) group as allocation granularity; and
determining, according to the resource allocation indication information, the frequency domain resource allocated by the base station to the UE;
wherein the method further comprises:
determining a size of the VRB group based on a size of an activated bandwidth part (BWP) and a predetermined correspondence between activated BWP sizes and VRB group sizes.

9. The resource allocation method according to claim 8, further comprising:
acquiring, by using higher layer signaling or Layer 1 (L1) signaling carried in a group common physical downlink control channel (PDCCH), a size of the VRB group indicated by the base station.

10. The resource allocation method according to claim 8, wherein the determining, according to the resource allocation indication information, the frequency domain resource allocated by the base station to the UE comprises:
determining a quantity of bits of the resource allocation indication information according to the size of the VRB group and the size of the activated bandwidth part (BWP); and
determining, according to the resource allocation indication information, a VRB group allocated by the base station.

11. The resource allocation method according to claim 10, wherein in the determining the quantity of bits of the resource allocation indication information according to the size of the VRB group and the size of the activated BWP, the quantity of bits of the resource allocation indication information is determined by using Formula 1 or Formula 2:

$$\lceil \log_2(\lfloor N_{RB}^{DL,BWP}/G \rfloor (\lfloor N_{RB}^{DL,BWP}/G \rfloor + 1)/2) \rceil, \quad \text{Formula 1}$$

$$\lceil \log_2(\lceil N_{RB}^{DL,BWP}/G \rceil (\lceil N_{RB}^{DL,BWP}/G \rceil + 1)/2) \rceil, \quad \text{Formula 2}$$

where G is the size of the VRB group, $N_{RB}^{DL,BWP}$ is a quantity of physical resource blocks (PRBs) or VRBs in the activated BWP, and G is an integer greater than or equal to 1.

12. A non-transitory computer-readable storage medium, storing therein a computer program, wherein the computer program is configured to be executed by a processor, to implement the steps in the resource allocation method according to claim 8.

13. User equipment (UE), comprising a storage, a processor, a transceiver, and a computer program stored in the storage and configured to be executed by the processor, wherein
the transceiver is configured to receive downlink control information (DCI) that is transmitted by a base station and comprises resource allocation indication information, wherein the resource allocation indication information is used for indicating a resource location of a frequency domain resource allocated to the UE, and the frequency domain resource is allocated by using a virtual resource block (VRB) group as allocation granularity; and
the processor is configured to determine, according to the resource allocation indication information, the frequency domain resource allocated by the base station to the UE;
wherein the processor is further configured to:
determine a size of the VRB group based on a size of an activated bandwidth part (BWP) and a predetermined correspondence between activated BWP sizes and VRB group sizes.

14. The UE according to claim 13, wherein the transceiver is further configured to:
acquire, by using higher layer signaling or Layer 1 (L1) signaling carried in a group common physical downlink control channel (PDCCH), a size of the VRB group indicated by the base station.

15. The UE according to claim 13, wherein the processor is further configured to:
   determine a quantity of bits of the resource allocation indication information according to the size of the VRB group and the size of the activated bandwidth part (BWP); and
   determine, according to the resource allocation indication information, a VRB group allocated by the base station.

16. The UE according to claim 15, wherein the processor is configured to determine the quantity of bits of the resource allocation indication information by using Formula 1 or Formula 2:

$$\lceil \log_2(\lfloor N_{RB}^{DL,BWP}/G \rfloor (\lfloor N_{RB}^{DL,BWP}/G \rfloor +1)/2) \rceil, \quad \text{Formula 1}$$

$$\lceil \log_2(\lceil N_{RB}^{DL,BWP}/G \rceil (\lceil N_{RB}^{DL,BWP}/G \rceil +1)/2) \rceil, \quad \text{Formula 2}$$

wherein G is the size of the VRB group, $N_{RB}^{DL,BWP}$ is a quantity of physical resource blocks (PRBs) or VRBs in the activated BWP, and G is an integer greater than or equal to 1.

* * * * *